Figures 1, 2:
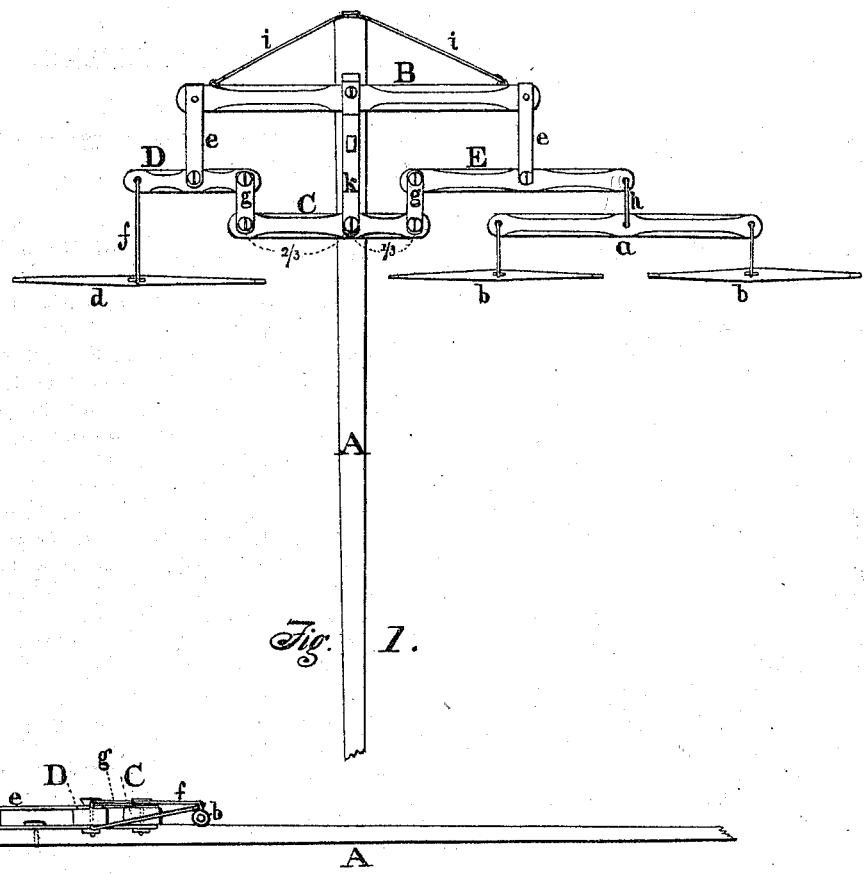

T. HOADLEY.
Three-Horse Equalizers.

No. 141,875.  Patented August 19, 1873.

UNITED STATES PATENT OFFICE.

THOMAS HOADLEY, OF TOULON, ILLINOIS.

IMPROVEMENT IN THREE-HORSE EQUALIZERS.

Specification forming part of Letters Patent No. 141,875, dated August 19, 1873; application filed May 9, 1873.

*To all whom it may concern:*

Be it known that I, THOMAS HOADLEY, of Toulon, in the county of Stark in the State of Illinois, have invented an Improved Three-Horse Draft-Equalizer for Plows and other purposes in which it may be necessary to employ three horses for draft; and do hereby declare that the following is a full, clear, and exact description thereof, reference being had to the annexed drawings making a part of this specification, in which like letters of reference refer to like parts, and in which—

Figure 1 represents a plan view; Fig. 2, a longitudinal elevation.

This is a combination of three levers lying in one plane, the central one pivoted to the tongue for draft, or to a plow. The others, which lie on either side, are pivoted to a cross-bar fixed immovably upon the tongue, and their inner ends are linked one to either end of the center lever. The latter is pivoted so as to have one arm two-thirds the length of the whole lever. The shorter arm sustains the draft of two horses, and the other arm the draft of the third horse, by the attached double-tree and single-trees to the outer ends of the outer levers.

A, in the drawings, represents the tongue, which may be attached, in any known manner, to the plow or other implement or machine, or to a vehicle; B, a cross-bar, fixed at its middle strongly to the heel of the tongue A, and may be about three feet in length, and be braced by rods $i$, running from either end to the tongue. From each end of B projects forward an iron strap or link, $e\ e$, working upon pins which pivot them to B, and, respectively, to levers D E in front. One of these levers, D, is short, or about twelve inches in length, and is pivoted, through its middle, as said, to one of said straps $e$. The outer lever E, which is in a line with the one just described, and is twice the length of lever D, is also pivoted, at its middle, to the other strap or link $e$ at the end of the cross-bar B. C is the third and foremost lever, and is pivoted to the tongue A. Its arm, adjoining or linked to lever D, is of the same length as the latter, and these are linked together, at the adjacent ends, by a strap or link, $g$. The other arm of lever C is one-half of the arm already described, and is attached, in a similar manner, to the adjacent end of the lever E. To the outer end of the latter a double-tree, $a$, is attached, which carries, at either end, the usual single-trees $b\ b$. To the outer arm of lever D is attached one single-tree, $d$.

The operation of this improvement is as follows: The lever C, being pivoted unequally upon the tongue A—one arm being one-third of the whole length of the lever—sustains and equalizes the draft of the two attached horses $b\ b$ against the one horse attached to the single-tree $d$.

What I claim as my invention is—

In a three-horse equalizer, the combination of the central draft-lever C, pivoted to the tongue A, straps $g\ g$, levers D E, bar B, and tongue A, substantially as and for the purpose described.

In testimony that I claim the foregoing improvement in three-horse equalizers I have hereunto set my hand this 25th day of April, 1873.

THOMAS HOADLEY.

Witnesses:
 CHAS. P. WATSON,
 CHARLES CHARLESON.